(12) United States Patent
Hartel et al.

(10) Patent No.: US 6,497,119 B1
(45) Date of Patent: Dec. 24, 2002

(54) METHOD FOR PRODUCING GLASS GOBLETS, TUMBLERS AND SIMILAR HOLLOW GLASSES, AND CORRESPONDING DEVICE FOR CARRYING OUT SAID METHOD

(75) Inventors: Robert Hartel, Aachen (DE); Josef Molz, Zwiesel (DE); Michael Horina, Zwiesel (DE); Edwin Kreiss, Langenlonsheim (DE); Alois Gruber, Frauenau (DE); Kurt Heller, Frauenau (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/424,731

(22) PCT Filed: May 29, 1998

(86) PCT No.: PCT/EP98/02931
§ 371 (c)(1),
(2), (4) Date: Nov. 30, 1999

(87) PCT Pub. No.: WO98/54102
PCT Pub. Date: Dec. 3, 1998

(30) Foreign Application Priority Data

May 31, 1997 (DE) ........................................ 197 22 921

(51) Int. Cl.$^7$ ................................................. C03B 9/33
(52) U.S. Cl. ........................ 65/29.14; 65/29.12; 65/66; 65/77; 65/78; 65/79; 65/80; 65/82; 65/109; 65/110; 65/158; 65/174; 65/224; 65/230; 65/240; 65/241; 65/242; 65/227

(58) Field of Search ................................. 65/77, 78, 79, 65/80, DIG. 10, 229, 230, 242, 226, 240, 241, 227, 158, 174, 29.12, 29.14, 66, 67, 110, 82, 109

(56) References Cited

U.S. PATENT DOCUMENTS 2,254,992 A * 9/1941 Bridges .......................... 65/80
4,212,841 A * 7/1980 Michel ........................... 65/79

FOREIGN PATENT DOCUMENTS

| DE | 1 224 886 | 4/1967 | |
| DE | 38 37 372 A1 | 5/1990 | |
| GB | 1346582 | * 2/1974 | ..................... 65/79 |

* cited by examiner

Primary Examiner—James Derrington
(74) Attorney, Agent, or Firm—Michael J. Striker

(57) ABSTRACT

A device and process for forming hollow glassware comprising producing solid glass blanks in a manufacturing line, storing the blanks, feeding the blanks to a manufacturing line for forming hollow glassware, preheating the blanks during the feeding step, supplying the preheated blanks to a heating stage, heating to form solid plastically deformable glass globs, transferring the glass gobs to a blow molding stage and blow molding the glass gobs supported by a bottom lifter in a blow mold.

36 Claims, 12 Drawing Sheets

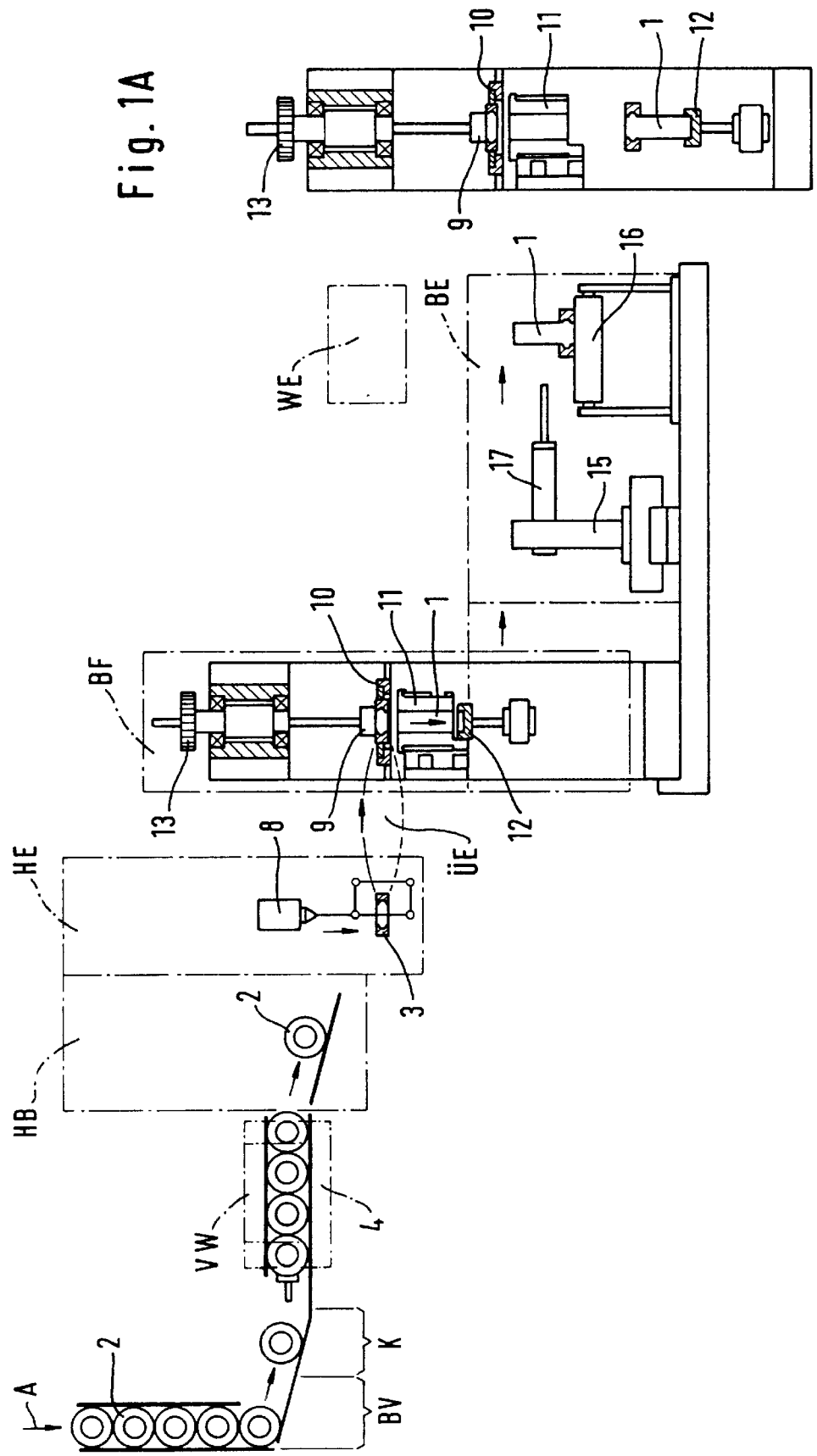

Fig. 3
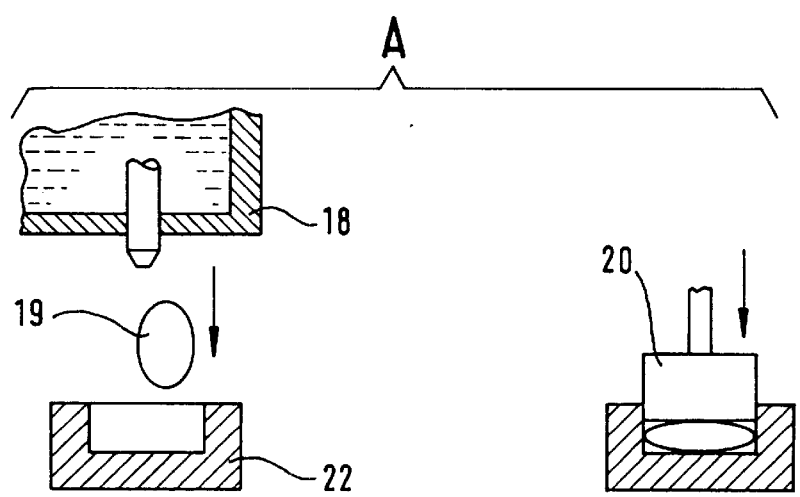
A
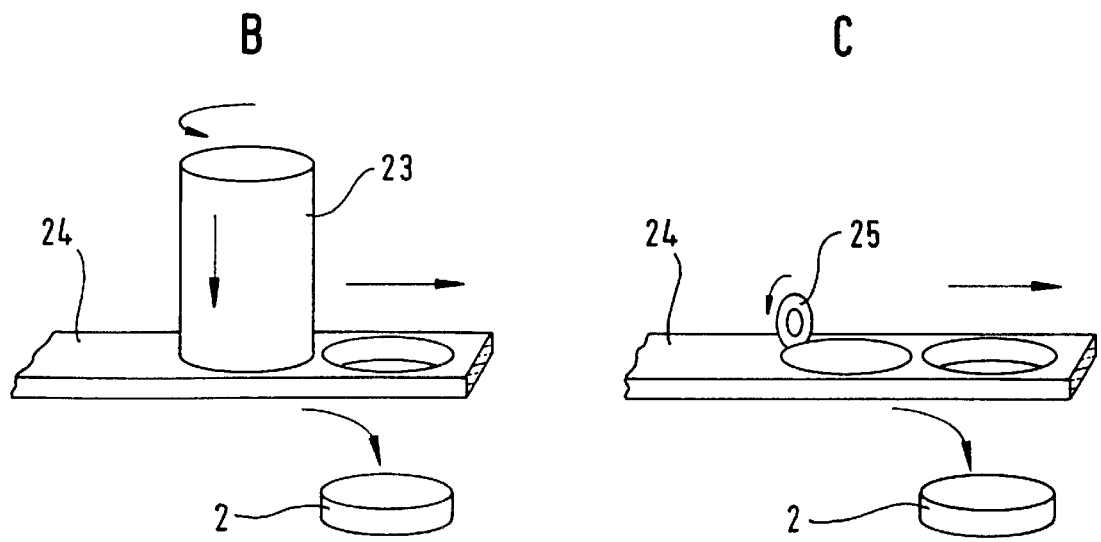
B    C

Fig. 4
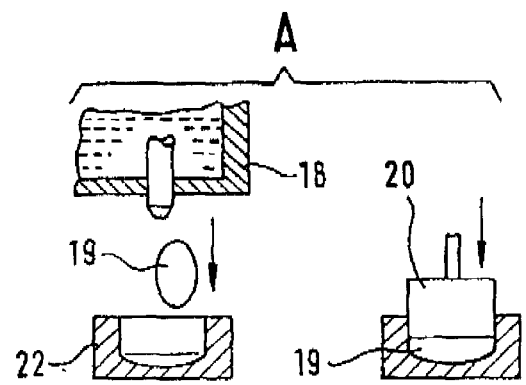
A
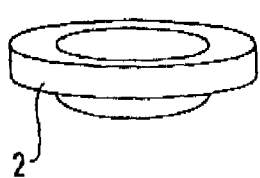
B
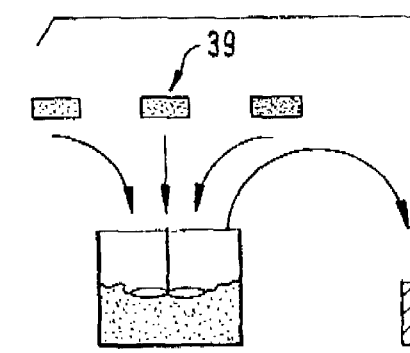
1 Mixing of raw materials
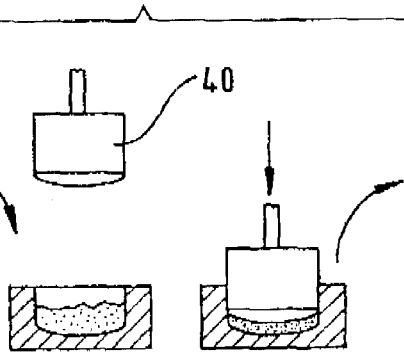
2 Shaping
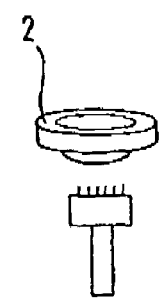
3 Drying
4 Cleaning
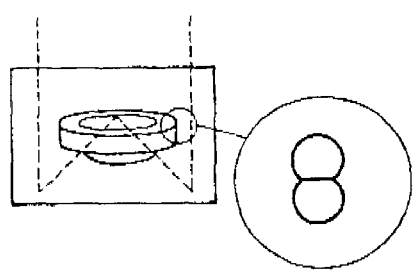
5 Sintering
6 Monitoring

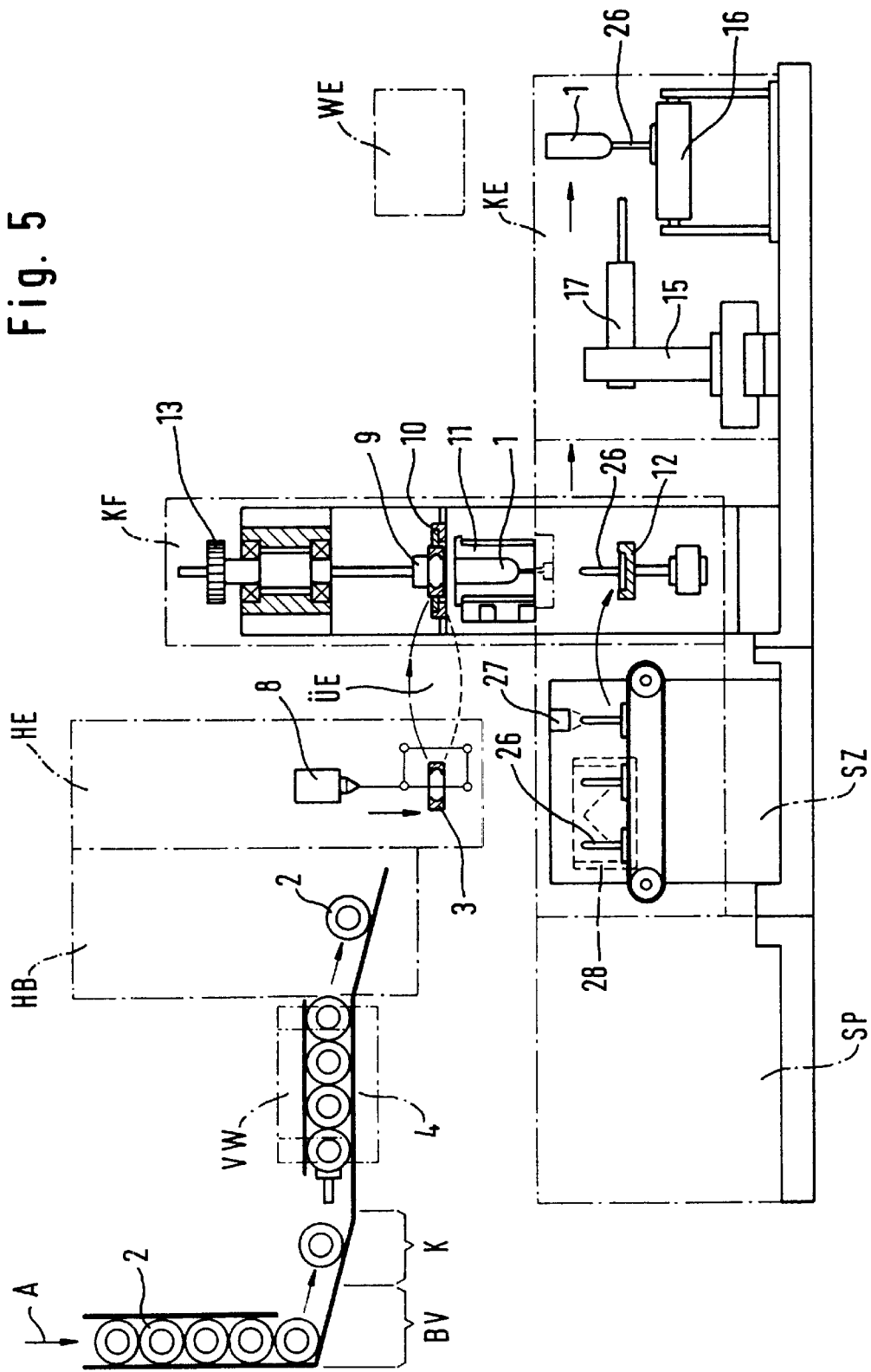

METHOD FOR PRODUCING GLASS GOBLETS, TUMBLERS AND SIMILAR HOLLOW GLASSES, AND CORRESPONDING DEVICE FOR CARRYING OUT SAID METHOD

BACKGROUND OF THE INVENTION

The invention concerns a method for producing stemware, tumblers and the like hollow glassware by blow molding a molten solid gob of glass.

The invention is further directed to a device for producing stemware, tumblers and the like hollow glassware with a blow molding stage comprising a blow head with a blow work ring, a blowing unit, a mold, and a bottom plate in which a molten gob of glass can be shaped to form the desired hollow glass, and with devices containing a removal stage for removal of the hollow glassware from the blow molding stage and for delivery to subsequent processes.

In the known methods for producing the aforementioned molded hollow glass bodies, the starting glass is prepared in a glass-melting furnace operation or glass-melting tank operation. Accordingly, DE-A1-32 39 517 shows a method for producing goblet-type glass objects in which a glass gob delivered from the feeder of a glass melting furnace is placed on a press plunger and is pressed between this press plunger and a preform to form a glass tablet or pellet. The table which is still plasticized is then disengaged from the preform and placed on an annular body on which it sinks in a goblet-shaped manner at least in its middle portion through the influence of gravitational force. This tablet is then given its definitive shape in a mold.

A method of the type mentioned above requires a melt tank for removal of the glass gob for the hollow glasses to be molded. This glass tank operation and the subsequent hollow glassware production process are directly connected, so that the following kinds of interactions occur:

Inhomogeneous glass tank operation and glass tank charging, depending on the weight of the product.

It is necessary to adapt to the glass tank capacity when changing over production machinery (retooling or conversion), so that additional inhomogeneities occur in the melting process.

Since a glass tank feeds several production lines, only clear glass can be melted in the tank, and this clear glass can be colored in a costly, complicated process only immediately before being fed into the respective production machinery.

The product changeover period is dependent on the magnitude of the weight difference between the successive products because this has a considerable effect on the duration for changing over the feed devices into the new stable operating state.

With smaller batch sizes, there is an increase in the number of production changeovers, resulting in a corresponding reduction in production efficiency. In addition, modern production machinery, since it is conceived originally for large batches, requires extensive outlay on molds and tools for the respective product combined with a corresponding input of personnel and operating means.

Moreover, one result of the previous type of mechanical stemware production was a high proportion of remainder glass which can amount to as much as 50 percent by weight. This remainder glass (cullet) requires costly transporting devices and feed devices for purposes of remelting in the tank, where it occasions additional expending of heating energy.

The individual production machines of a production line are linked together in the known methods and devices and must consequently be adapted to one another. As the quantity of linked arrangements increases, so also does the breakage rate because there is a risk of breakage each time the glass is handled.

SUMMARY OF THE INVENTION

It is the object of the invention to carry out the method mentioned above and to construct the device mentioned above in such a way that a more economical production of the aforementioned hollow glassware is made possible. It will be possible to carry out the production of this hollow glassware independent from the tank operation glass melting process.

According to the invention, this object is met with respect to the method by the following steps:

production of solid glass blanks in the form of fabricated semifinished products in their own separate manufacturing line;

storage and supply of semifinished products;

feed of semifinished products from the reserve to the manufacturing line for shaping the hollow glassware accompanied by preheating of the semifinished products;

supplying preheated semifinished product for further heating;

heating of the semifinished product to blowing temperature to form a plastically deformable solid glass gob by additional heating;

mold blowing of the plasticized glass gobs to form hollow glass in a blow mold with support of the blown hollow glass body by a bottom lifter;

removal of the hollow glassware from the blow mold and delivery to subsequent processes. With respect to the device, the object is met by:

a stage with storage devices and transport devices for supplying and feeding intermediately stored solid semifinished glass products for the hollow glassware which is to be formed and which has been produced beforehand in its own separate device;

a subsequent preheating stage with heating devices for preheating the solid semifinished products;

a stage with transport devices for supplying the solid semifinished product to a semifinished product heating stage with heating devices for further heating of the semifinished products at least to a temperature close to the blowing temperature;

a transfer stage with devices for transferring the solid semifinished products that have been further heated in the semifinished product heating stage into the blow mold stage, where they are made available as plastically deformable solid glass gobs for blow molding the hollow glassware.

Since the glass raw material is in the form of semifinished product which is adapted to the end product and produced in stock in a separate process and is not heated to the necessary blowing temperature until immediately before the blowing process in a separate continuous furnace, a homogeneous glass tank operation with consistent melt quality is possible.

Simple conversion of the hollow glass fabrication from clear glass to colored glass is also possible.

The invention also advantageously results in a glass tank operation which is independent from the manufacturing line for the molded hollow glass body with respect to time, location and organization. The hollow glass manufacturing process can be carried out in a manageable, less cost-intensive environment, so that great flexibility is achieved in site selection. The high-technology, high-investment glass tank operation can also be carried out independent from and remote from the hollow glass manufacturing process.

As a result of the invention, the glass tank can also be used in a three-tiered manner without retooling interruptions for producing the semifinished products. This enables a more flexible manufacture of smaller batch sizes. It is also possible to test new techniques and/or technology at individual function modules of the device according to the invention without disrupting the entire production process. The invention also opens up possibilities for economizing on personnel, material, energy and mold costs.

There are a number of possibilities, some of which are shown hereinafter, for arranging and producing glass blanks in the form of fabricated semifinished products for mold blowing in their own separate manufacturing line.

According to a further development of the invention, a first possibility consists in producing semifinished product indirectly by punching (stamping) or cutting round flat glass disks from a flat glass as semifinished products for mold blowing.

This possibility has the following advantages:
simple manufacturing process, simple transport and simple supplying of semifinished products;
good, simple handling of the flat semifinished product;
splitting up of semifinished product production spatially into flat glass blank and the actual semifinished product production.

However, the following factors must be taken into account:
technological cost of semifinished product production;
the glass waste resulting from cutting out or punching out must be remelted;
the risk of destruction or damage to the semifinished product during transport.

According to a development of the invention, a further possibility consists in direct production of semifinished products by casting a flat tablet in a mold following the melting of a glass blank as semifinished product for mold blowing.

This second possibility has the following advantages:
simple manufacturing process (conventional tank operation glass melting process), simple transport and simple supply of cast semifinished products;
good, simple handling and supply of flat semifinished product.

However, the risk of destruction and damage to the semifinished product during transport must be taken into account.

A third possibility, according to a further development of the invention, consists in casting a profiled tablet whose shape is optimized with respect to the molded hollow glass body to be produced.

The advantages are:
simple manufacturing process for the shape-optimized, profiled tablet (conventional glass tank operation);
enables a process which is optimized for blowing.

The following considerations should be taken into account:
risk of destruction or damage to the semifinished product during transport;
difficult handling and storage of the profiled semifinished product.

A fourth possibility, according to a further development of the invention, consists in producing a shape-optimized semifinished product in a semifinished product carrier. This possibility is characterized by direct production of a semifinished product, whose shape is optimized with respect to the molded hollow glass body to be produced, by filling a semifinished product carrier having an optimized internal shape with glass raw material from a melt, wherein the semifinished product remains in the semifinished product carrier in the subsequent steps until the blown molded hollow glass body is severed and forms a processing unit together with this semifinished product carrier.

The semifinished product carrier is preferably a correspondingly shaped ring, wherein a receptacle for the semifinished product carrier is provided in the blowing unit of the blow molding stage as work ring during mold blowing.

This possibility has the following advantages:
protection of the semifinished product from destruction and damage by the surrounding semifinished product carrier;
enabling a process that is optimized for blowing, wherein wasted remainder glass can be reduced by up to 50% when the inner contour of the annular semifinished product carrier is optimal;
simple manufacturing process, simple transport automation and stackability of semifinished product;
facilitated handling processes through standardized geometric shape of the semifinished product carrier;
use of the ring as work ring during the blowing process;
substitute for excess or top glass, therefore less glass volume in circulation.

However, the following considerations must be taken into account:
supplying the semifinished product carrier;
need for process of severing the semifinished product from semifinished product carrier;
preparation and disposal of the semifinished product carrier.

In the production of molded hollow glass bodies in the shape of goblets with stems, there are different possibilities for assembling and connecting the stem and goblet. According to a first further development of the invention, the method is characterized by the assembling and connection of stems with the mold-blown goblet in the blow mold, wherein these stems are manufactured externally as semifinished product.

In a method of this kind, the stems are fabricated independent from the production of the hollow glass.

According to an alternative development of the invention, the method is characterized by the assembly and connection of stems with the mold-blown goblets in the blowing station, wherein the stems are manufactured within the manufacturing line.

In an embodiment form of the kind mentioned above, there is no longer a need to supply semifinished stem products and the substantial expenditure for feeding these semifinished products to the production process is eliminated.

The further heating of the semifinished product to blowing temperature can also be carried out in different ways. According to a first development of the invention, this further heating is carried out in two steps, namely, by a first further heating shortly before the blowing station, followed by transfer of the not-yet-plasticized semifinished product to this station, and by a second further heating of the semifinished product to blowing temperature in this station.

This embodiment form facilitates handling of the semifinished product in the blowing station.

According to an alterative embodiment form, it is also possible for the heating of the semifinished product to blowing temperature to be carried out in an individual step in a separate device with transfer of the plasticized semifinished product to the blowing station.

Since there are problems involved in the handling of plasticized glass, the transfer of the semifinished product to the blowing station in this alternative is also not without problems.

When the desired manufacturing depth provides for severing the top glass from the rest of the molded hollow glass bodies, this is preferably carried out by means of a laser beam in the blowing station after opening the mold.

When the method is carried out in this manner, further edge machining of the molded hollow glass body is dispensed with.

According to a further development of the invention, a semifinished product monitoring stage with devices for monitoring the state of the semifinished products is added between the supply stage and the preheating stage.

This ensures that only the semifinished products suitable for production will be supplied to the continued manufacturing process.

According to a further development of the invention, the heating devices in the preheating stage are formed by a continuous heating furnace with radiation burners or the like.

Conventional heating devices can accordingly be used in the preheating stage.

According to a further development of the invention, the transport devices in the stage for providing the semifinished products are formed by pushers in connection with a chute or by a gripper arm. In this way, it is possible to supply the semifinished products in a simple manner.

According to another development of the invention, the heating devices in the semifinished product heating stage are formed alternatively by a heat radiator, a gas radiator or gas-oxygen radiator or by microwave radiators which are arranged in a substantially closed chamber, preferably below the semifinished product.

This makes it possible to heat the core area of the glass blank while minimizing heat losses in a simple manner.

According to a development of the invention, the heating devices in the semifinished product heating stage are so arranged that the semifinished products are heated to a temperature in the neighborhood of the blowing temperature, preferably 900° C., with heating to the blowing temperature in the blow head of the following blow molding stage through the use of a laser with beam feed through a bore hole in the blow head for supplying the compressed air.

This two-stage heating to blowing temperature has the advantage that the semifinished products are not plasticized until immediately before the blow molding stage and can also be handled more simply up to this stage.

As an alternative to this embodiment form, the heating devices can also be arranged in such a way that further heating to blowing temperature is carried out in an individual step in a separate device in parallel with the blowing process.

This variant has the advantage that it does not prolong the main cycle.

According to a development of the invention, the devices in the transfer stage are formed by a swivel arm with grippers. These devices allow a simple possibility for transferring the heated semifinished product to the blow mold stage.

In the known methods and devices, the individual process steps are carried out on a plurality of machines which are arranged one behind the other and spatially separated from one another. This conception is disadvantageous in that it is very personnel-intensive, causes relatively extensive glass breakage during transport from one machine to the other and requires relatively long conversion times of about 1.5 hours because the blowing machine and associated machinery must be set up for another product in a mutually dependent manner and production cannot begin again until the lengthy conversion process has been concluded; further disadvantages consist in the relatively high consumption of energy for glass melting because a relatively large amount of broken glass and top glass must be returned to the melt tank and remelted, and, not least, in the high mold costs resulting from the fact that a large quantity of mold sets must be kept in store irrespective of the batch size of the hollow glass article to be manufactured.

These disadvantages can be overcome, according to a further development of the invention, when the stages comprising semifinished product preparation, semifinished product heating, blow molding and removal are arranged as independent function modules and form the basic framework of a modular manufacturing unit to which further modules, such as stem feed, stem pressing, and severing of top glass, may be added optionally.

A particularly compact production device can be produced when a plurality of manufacturing units are combined in a modular manner to form a section and a plurality of sections are connected together to form a production device. Alternatively for this purpose, every manufacturing unit can be outfitted with individual function modules or a plurality of manufacturing units can share function modules. A clear material flow results when the stages comprising semifinished product supply, semifinished product monitoring and semifinished product preheating are arranged behind the manufacturing units and when a discharging device for joint discharge of the produced molded hollow glass bodies and an automatic mold changing device are provided transversely in front of the manufacturing units and longitudinal to the production device. In known cases, the molds were changed manually.

The modular production device characterized above has a number of advantages.

As a result of the increased automation when changing molds and by means of joining successive process steps on only one manufacturing device, it is possible to economize substantially on personnel.

Glass breakage is appreciably reduced because the transport paths between the process steps where waste currently takes place due to breakage are eliminated.

The modular construction of the manufacturing device in which every manufacturing unit operates autonomously has the following advantages when converting to a different product: Production can already take place at the manufacturing units that are converted first while additional stations are being converted (sectional production run). The changing of molds necessitated in the process is carried out automatically. Production losses due to conversion work are noticeably reduced compared with methods according to prior art because of these reduced conversion periods in the installation according to the invention.

Through improved utilization of the raw glass, energy consumption for melting glass can be reduced because less broken glass and top glass is returned to the melt tank.

In the production device according to the invention, the quantity of molds can be adapted to the batch size of the hollow glass article to be produced because also different molds can be used simultaneously on the modular manufacturing units. Moreover, in the case of mold sets of lower piece number, fewer molds need to be kept in store as substitutes. For example, in the manufacture of goblets with stems, the quantity of molds can be adapted to the batch size by stem fabrication which is independent from the blowing process, irrespective of the goblet which is to be added later. Accordingly, stems which will subsequently be combined with different goblets to form stemware can be manufactured in high piece numbers because different goblet shapes can have the same stem geometries in a series of glasses. This results in optimum utilization of molds which improves with increasing batch sizes. Further, the maintenance intervals can be prolonged appreciably.

Therefore, considerable economies can be achieved by means of this concept in the area of press molding and blow molding.

Further developments and advantages of the invention are given with reference to the description of embodiment examples shown in the drawings.

BRIEF DESCRIPTION OF THE DRAWINGS

FIG. 1 shows a schematic view of the production run, according to the invention, in the production of a tumbler as molded hollow glass body;

FIG. 1A shows an enlarged section from FIG. 1 relating to the blowing station;

FIG. 3 shows a semifinished product in the form of a flat tablet which is produced by casting in a mold according to variant A, by punching (stamping) from a flat glass according to variant B, or by cutting out of a flat glass according to variant C;

FIG. 4 shows a shape-optimized profiled tablet as a semifinished product which is produced by casting in a mold according to variant A or by sintering according to variant B;

FIG. 5 is a schematic view of the production run, according to the invention, in the production of goblets with stems;

DESCRIPTION OF PREFERRED EMBODIMENTS

Figure 1B:
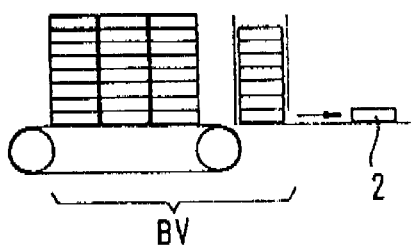
FIG. 1B shows the storage and supply of semifinished products, including their feed, according to a first construction, by conveyor belt.
Figure 1C:
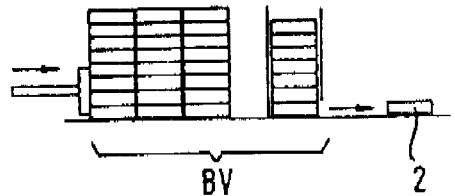
FIG. 1C shows an alternative arrangement of semifinished product supply with a pusher as an alternative arrangement to FIG. 1B.

FIG. 1, with the enlarged section in FIG. 1A and the additional views in FIGS. 1B to 1K, shows an advantageous embodiment form of the device according to the invention which operates by the method, according to the invention, for producing molded hollow glass bodies 1, in this case, in the form of tumblers.

The starting product for the production of tumblers 1 is a glass blank in the form of fabricated semifinished product 2 fed at location A, identified by the arrow, of a semifinished product supply BV of the production device.

Before the start of production and during the production of the tumblers 1, the semifinished products 2 which are produced in a separate manufacturing line are automatically removed from a semifinished product store and fed to the semifinished product supply BV. It serves as a buffer between the storage and the production device and is located in the vicinity of the production device.

The separate production of the semifinished products 2, in this case in the form of a shape-optimized semifinished product in an annular semifinished product carrier 3, will be described more fully hereinafter with reference to FIGS. 2 to 4.

The semifinished products are fed individually from the supply BV to the semifinished product monitoring unit K arranged behind the latter.

The semifinished products 2 can be supplied from stacks in horizontal or upright position. The foremost stack is located at a point from which the semifinished products are transferred individually to the subsequent monitoring unit K. This can be realized, for example, by a belt according to FIG. 1B on which the stacks are transported for isolation or by transporting over a plane surface according to FIG. 1C in that one stack pushes the next stack forward.

The semifinished products are automatically monitored and sorted individually with respect to weight, size and state (broken, etc.) in the semifinished product control unit K at room temperature. Only those semifinished products suitable for production are supplied for further manufacture. The monitoring unit K is a closed system in which the semifinished products 2 are transported back and forth in individual cycles. The unit can be outfitted with various measuring devices, e.g., with weighing cells for weight monitoring or with a camera for monitoring their state.

The semifinished products 2 are transferred individually from the supply BV to the monitoring unit K, e.g., via a chute, as is represented symbolically in FIG. 1.

The suitable semifinished products 2 are transferred by a transferring device from the monitoring unit K to the following continuous preheating furnace 4 while waste parts are discarded.

Figure 1D:
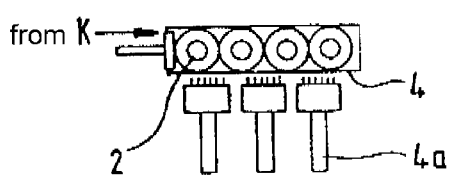
FIG. 1D shows the preheating of the semifinished products in a preheating continuous furnace.

In the furnace 4, the semifinished products 2 are preheated from room temperature to about 500° C. so that the subsequent heating can be carried out more quickly immediately before blowing at 1050° C. FIG. 1D shows a schematic view of the transport of semifinished products in the preheating furnace 4. The heating furnace 4 which is outfitted with burners 4a operated by gas or electricity works in continuous operation, i.e., the semifinished products 2 coming out of the monitoring unit K are introduced into the furnace 4, transported through the furnace 4, in that they are pushed further by the subsequent semifinished products, and are removed at the end of the furnace.

The actual manufacturing unit follows the continuous preheating furnace 4. It is composed of a plurality of function modules. The function modules which are designated by boxes in dashed lines in FIG. 1, semifinished product supply HB semifinished product preheating HE, tumbler shaping BF tumbler removal BE, form the basic framework of a manufacturing unit. Further modules can be added optionally, e.g., in the case of goblet production to be described hereinafter the following function modules are added:

stem pressing, connection of stem and goblet severing of top glass.

The stem can also be supplied as a semifinished product.

The preheating stage VW with furnace 4 is followed by the semifinished product supply HB. In this stage HB, the preheated semifinished product 2 is removed individually from the preheating furnace 4 and fed to the following semifinished product heating unit HE.

Figure 1E:
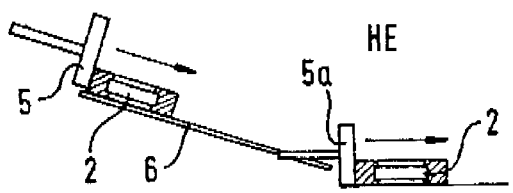
FIG. 1E shows the supplying of preheated semifinished products for further heating with a pusher arrangement via a chute.

As is shown in FIG. 1E, the semifinished product 2 can be removed from the furnace 4 by a pusher 5 and guided via a chute 6 to the semifinished product heating unit. The semifinished product is again pushed into the heating unit HE with a pusher 5a.

Figure 1F:
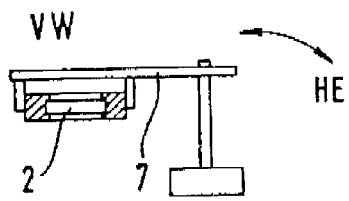
FIG. 1F shows an alternative with semifinished product supply via a gripper system.

As an alternative to the delivery of semifinished products via a chute according to FIG. 1E, a gripper arm 7 can be used, according to FIG. 1F, to remove the semifinished product 2 from the preheating furnace 4 and deposit it in the semifinished product heating unit HE.

Figure 11:
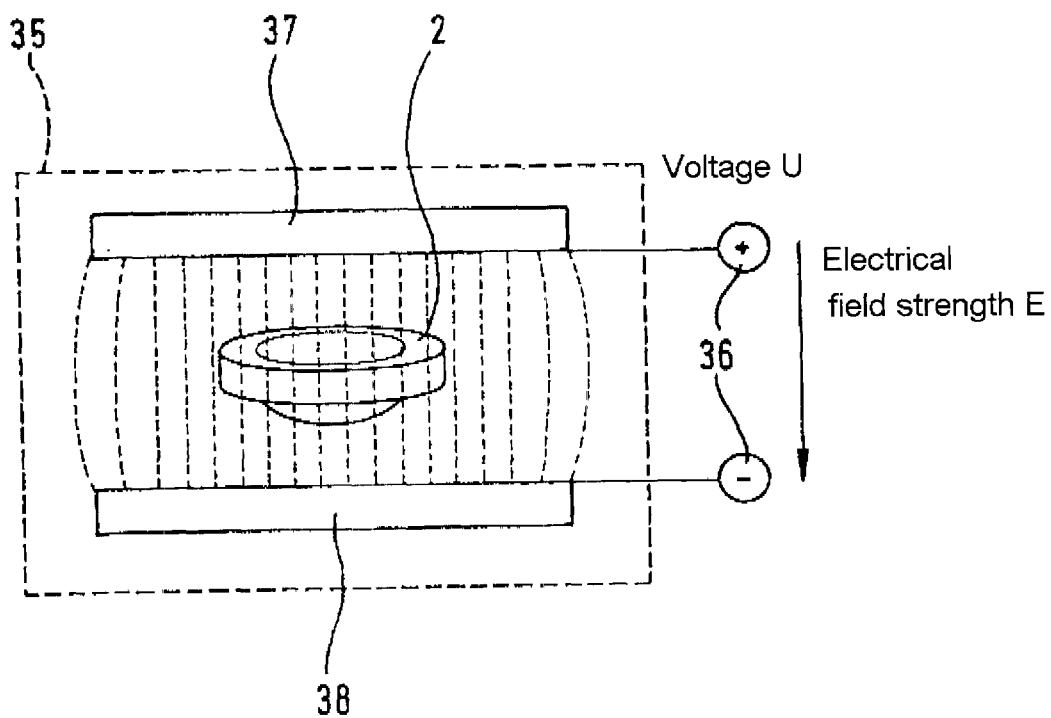
FIG. 11 is a schematic view of the heating of a semifinished product according to FIG. 4 by means of a microwave system.

The semifinished product supply HB is followed by stage HE, that is, the semifinished product heating, before blowing the tumbler 1 in the following function module BF. A deliberate heating of the core area of the glass blank in the semifinished product carrier 3 is achieved by heating the semifinished product before blowing. Heating is carried out by means of a heat radiator 8 which can be a $CO_2$ laser or, alternatively, a gas radiator or gas-oxygen radiator or a microwave radiator. A microwave system of this kind for heating the semifinished products 2 is shown in FIG. 11. The system comprises a microwave active space 35, input-coupling 36, inlet surface 37 and outlet surface 38. Heating is carried out by converting loss output proportional to the operating frequency and to the square of the electric field strength. This principle allows short heating times and homogeneous heating.

Figure 1G:
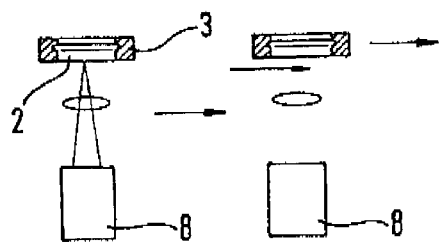
FIG. 1G shows the heating of the semifinished product to blowing temperature with a radiation source arranged below the semifinished product.

In order to minimize radiation loss, the heating by the heat radiator 8 is carried out in a substantially closed chamber. The chamber is opened only when changing the semifinished product carrier 3 with the semifinished product 2 as is shown in FIG. 1G. FIG. 1G also shows an arrangement of the heat radiator 8 below the semifinished product carrier 3 with the semifinished product 2. This heating from below is a preferred variant.

In the semifinished product heating stage HE, the preheated semifinished product 2 is further heated from the preheating state VW of about 500° C. to approximately 1050° C., so that the glass is plastically deformable. Two variants A, B are possible for further heating:

A) Further heating in two steps:

Step 1 heating from approximately 500° C. to approximately 900° C. shortly before the tumbler molding unit BF, followed by transfer to the tumbler molding unit.

Step 2

Figures 1H, 1K:
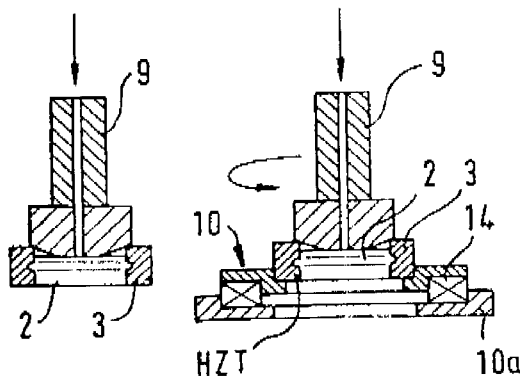
FIG. 1H shows the final heating of the semifinished product to blowing temperature inside the blow head by a combined blow head radiation/blowing.
FIG. 1K shows an enlarged section from the blowing station with the preferred variant in which the semifinished product carrier also forms the blow ring.
Figure 1J:
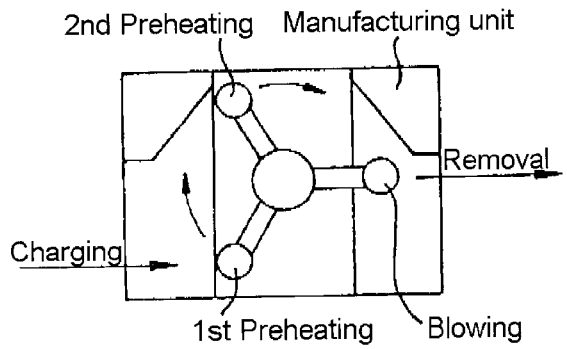
FIG. 1J shows the heating to blowing temperature in parallel with the blowing process.

Further heating to approximately 1050° C. directly in the tumbler molding unit BF with a special blow head 9 according to FIG. 1H through a combination of radiation and blowing (laser beam/compressed air) in the direction indicated by the arrow.

The advantage of variant A consists in that the semifinished products are first plasticized directly in the tumbler molding unit BF; they are also easier to handle up to this point. This variant A allows the use of inductive heating.

B) Further heating in one step

Heating from 500° C. to approximately 1050° C. is carried out shortly before the tumbler molding unit BF in parallel with the blowing process in a special device which prevents the already plastic glass from running.

Advantage: The semifinished product 2 is heated in parallel with the molding process as in shown in FIG. 1J and thus does not prolong the principal cycle, although it should be noted that delivery of the plasticized glass to the molding process is more difficult.

Proceeding from the heating unit HE, the semifinished product 2 with the carrier 3 must be deposited in the tumbler molding unit BF by means of a transfer step ÜF as is symbolized in FIG. 1 by an arrow. This transfer can be carried out by means of a swiveling arm by rotation (vertical, horizontal) or by translation. The person skilled in the art has various possibilities at his disposal for this purpose. The semifinished product carrier 3 with the semifinished product 2 is held on the swivel arm during heating and during the transferring movement by a gripper.

The tumbler molding unit BF in which the tumbler is formed by blowing and which is shown in section in somewhat enlarged scale is the core of the manufacturing unit, since the semifinished products 2 are shaped into tumblers 1 therein by blowing. The actual shaping corresponds to the manufacturing process commonly used today which is characterized by blowing a rotating tumbler in a two-part, non-rotating mold, wherein the tumbler is temporarily supported by a bottom lifter. In principle, a rotating mold with a stationary parison can also be used.

The tumbler molding unit BF comprises the following:

1. Blow Head 9

The blow head moves vertically up and down from a top position to a bottom position. It switches the blowing process on and off and, in the case of the variant according to FIG. 1H, serves to control radiation in a two-step heating of the semifinished product to blowing temperature. Its object is to fix the plastic glass during molding, to apply blowing pressure and, optionally, to drive the work ring and, if necessary, guide the laser beam for plasticizing the glass in the alternative according to FIG. 1H.

2. Blowing Unit 10

Its state is stationary or rotating. Its object is to carry the work ring supporting the plastic glass during blowing and to support and drive the blow head. Alternatively, the work ring can advantageously be formed by the semifinished product carrier 3, as is shown.

3. Blow Mold 11

It is in the open or closed state and its object is to shape the tumbler.

4. Bottom Lifter 12

It is in the upper, middle or lower state, is stationary or rotating, holds or releases and its object is to support the tumbler 1 during blowing (especially with heavy glass), to hold the tumbler 1 during transfer from the shaping step to the removal unit BE.

The drive for the blow head 9 and the bottom lifter 12 is designated by 13.

In the view shown in FIG. 1A, the mold 11 is open, the work ring carrier of the blowing unit 10 is likewise open, and the bottom lifter 12 with the tumbler 1 is in the lower position in which the removal of the tumbler 1 is carried out.

The blow mold 11 has a vertically divided, two-part mold jacket for forming the parison with a two-part suspended blow mold, wherein the opening and closing of the mold is controlled automatically. It is necessary to change the blow mold when wear occurs and when changing the tumbler shape; this changing of the blow mold is carried out automatically. This automatic changing is realized by means of a changing unit WE according to FIG. 1 for a plurality of manufacturing units as will be explained more fully hereinafter.

Pastes (sawdust, et al.) are used for preparing the blow mold or the mold is saturated with water to form steam cushions between the glass and the mold (parting agent).

The bottom lifter 12 serves to improve the wall thickness distribution and the base quality of the tumbler, especially in the case of heavy glass. It rotates synchronously with the blowing unit 10 and has an automatically controlled up-and-down movement for defined bottom reinforcement. For manufacturing twisted glassware, the rotating frequency can have an adjustable phase offset relative to that of the blowing unit and blow head.

The bottom lifter, also called the bottom plate, is outfitted with a device (gripper, suction head, or the like) for receiving the tumbler 1 and can be changed by a quick-change system.

Heat radiators and cooling nozzles are used to control the temperature during the molding process. The cooling nozzles serve for air cooling and water cooling to influence the rim thickness of the tumbler 1 by cooling the parison and/or the mold and to protect the mold from overheating. The cooling nozzles can be adjusted to the optimum position and throughput. Actuation is carried out in a freely selectable manner via magnet valves.

FIG. 1K is an enlarged view showing an embodiment form of the blow head 9 and blowing unit 10 in which the semifinished product carrier 3 forms the work ring of the blow mold at the same time. The rotating movement of this work ring which rests on a support 10a of the blowing unit 10 via a bearing 14 so as to be rotatable is transmitted via the blow head. In addition to the compressed air, a laser beam is guided in the direction of the arrow according to the variant in FIG. 1H for plasticizing the semifinished product 2 on the blowing station.

The semifinished product carrier 3 undergoes the following steps in the blowing unit:

Guiding: transfer from the melting point to the blowing unit;

Centering: centering in the blowing unit so that it revolves circularly during blowing;

Fixing: securing against rotation during blowing;

Sealing relative to the blow head: so that blowing air does not escape;

Releasing: before its removal;

Removal: of the semifinished product carrier, including attached tumbler, reversal and transfer to the subsequent processes.

The process of tumbler molding by blowing runs as follows:

1. Starting Position

Blow head open, blowing unit and bottom lifter stationary, mold open, semifinished product carrier (HZT) in heating position, bottom lifter in lower position.

2. Run

Transfer of the hot HZT to blowing unit or, alternatively, depositing of the plastic semifinished product on the work ring, lowering of the blow head, start of rotating movement of blow head with blowing unit and bottom lifter (synchronous), switching on blowing air (intermittent or continuous, as desired), lifting of bottom lifter up to developing parison, switching on cooling air (optional), lowering of bottom lifter with parison, closing of mold and molding of tumbler, opening of mold, lifting of bottom lifter up to tumbler, gripping of tumbler, possible severing of tumbler from HZT or opening of HZT support and transfer of HZT downward, removal of tumbler downward to next manufacturing stage.

Immediately after the transfer of the hot HZT to the blowing unit, the next HZT is heated in stage HE, so that blowing and heating run in parallel. After removal of the tumbler, the process starts from the beginning.

As is shown in FIG. 1, the molding of the tumbler in function module BF is followed by tumbler removal BE. In this step, the finished hollow glass 1 standing on the bottom lifter 12 is gripped by a removal device 15 and deposited on a discharge device 16.

A pneumatically operated gripper 17 which is adapted to the respective article and can be exchanged in modular manner lifts the tumbler 1 from the bottom lifter 12. Through a combination of rotating and translatory movement, the tumbler is guided to the discharge device 16. Depending on the manufacturing depth (with or without stem, with or without top glass) of the respective hollow glass when removed, the hollow glass must be reversed and placed on the top glass or rim before being deposited on the discharge device; otherwise, it is deposited without turning.

An essential element of the present invention is the use of semifinished products 2 as starting products which are produced in a separate manufacturing line independent from the blow molding process. In this connection, the production of a shape-optimized semifinished product 2 in an annular semifinished product carrier 3, which is also the subject of the view in FIG. 1, is particularly significant. The production of this special semifinished product having the essential advantages indicated above, and its multifold functions will be described more fully with reference to FIG. 2 with respect to states A to G.

First, it is the object of the circular semifinished product carrier 3 to receive the semifinished product 2 as is shown in step C. For this purpose, the semifinished product carrier 3, while resting on a base 21, is filled with glass 19 from a glass melt 18 by gob feeding in step A, wherein the glass 19 is given the shape-optimized configuration according to state B by a press plunger 20 in the carrier.

In the following glass molding process, the glass 2 is melted in the carrier 3 by means of heat source 8 (state D) before it is molded in the mechanical blowing process with the blow head 9 to form a hollow glass 1, wherein the previous work ring is substituted by the semifinished product carrier (step E).

After the blowing process, the semifinished product carrier 3 can be used for simplified, secure transport of the hollow glasses 1 until it is purposely severed from the hollow glass.

States F and G show two different manufacturing steps (F=transport with top glass, G=transport without top glass).

The semifinished product carrier 3 generally protects the glass blank, the semifinished product 2, from damage during transport and facilitates storage of the semifinished products, especially through their stackability.

The basic construction of the semifinished product carrier is as follows:

The semifinished product carrier is annular.

The open ring core is filled with glass which is subsequently shaped into hollow glass by molding. In so doing, it must withstand the glass melting temperatures of up to 1100° C. (thermal dimensional stability).

The profile of the inner ring contour is optimally adapted to the subsequent hollow glass molding process.

The outer ring contour is standardized with respect to shape, thickness and diameter so that the semifinished product carrier can be received in uniform blowing stations. The ring must be centered and fixed on the blowing station because the station rotates at up to 50 revolutions per minute during the blowing. The blow head lies on the ring during blowing.

The weight of the blank, and therefore the weight of the subsequent hollow glass, varies depending on the various degrees of filling of the ring.

After the hollow glass is severed from the semifinished product carrier, a small remainder, depending on the process, remains in the ring. This remainder must be prepared (cleaned, and possibly coated with parting agent) before the ring can be filled with glass again.

Figure 2:
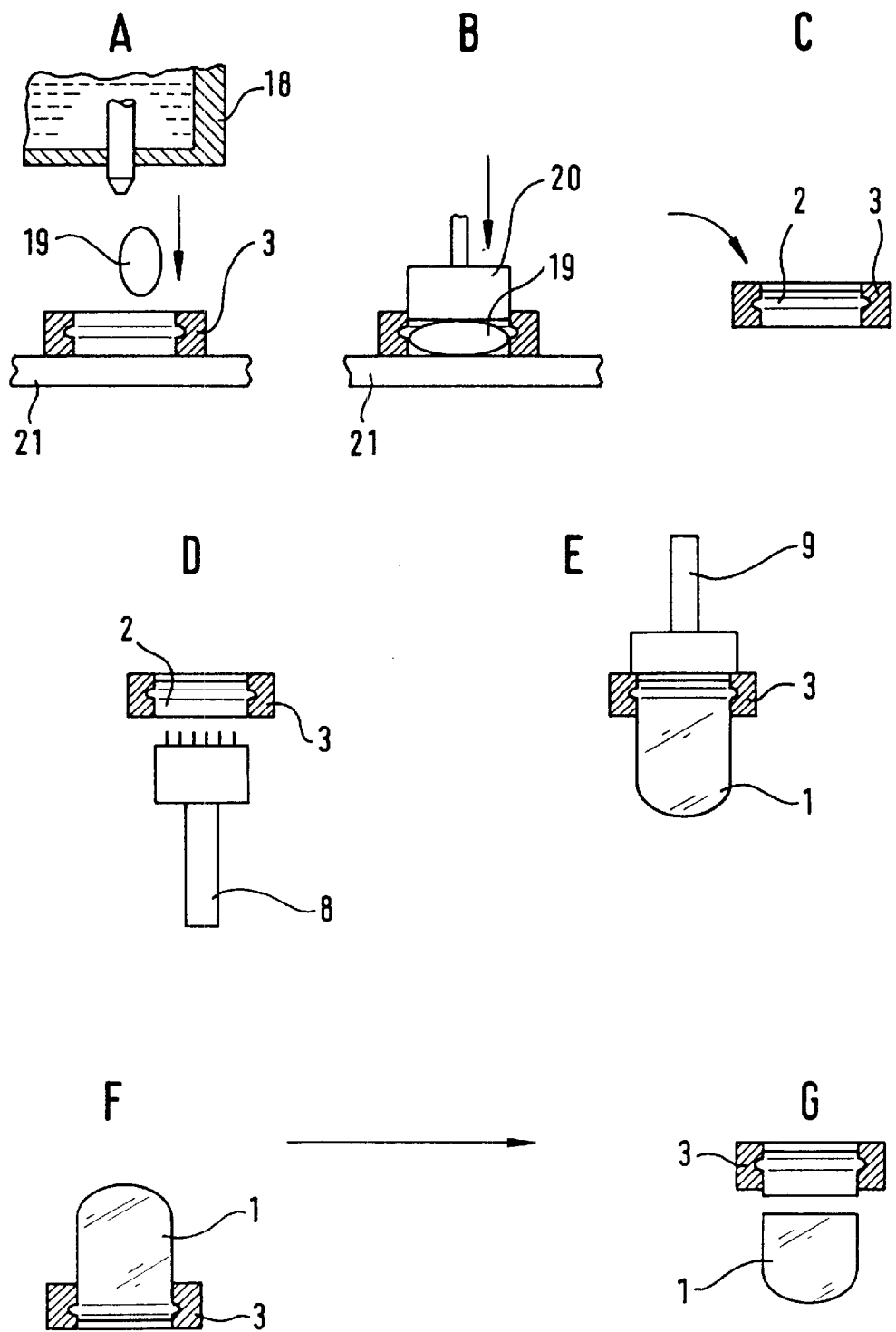
FIG. 2 shows different states A to G of the production of a shape-optimized semifinished product by pouring raw glass from a melt into a semifinished product carrier, wherein the semifinished product remains in the semifinished product carrier in the following steps until the blown molded hollow glass body is severed.

In addition to the semifinished product in FIG. 2 which is produced with the advantages described above, there are other possibilities for the configuration and production of a semifinished product. According to FIG. 3, for example, the semifinished product can be a round flat glass disk 2 which can be produced in different ways as shown in FIGS. 3A, 3B and 3C. According to FIG. 3A, the tablet 2 corresponding to FIG. 2 (A, B) can be produced in such a way that a mold 22 is filled by gob feeding a glass gob 19 from a glass melt 18, wherein the glass gob 19 which has assumed the shape of a lens in the interim, is pressed by a press plunger 20 in the mold 22 to form a flat disk. According to FIG. 3B, the tablet 2 can also be produced by punching out of a flat glass 24 by means of a suitable tool 23. It is also possible, according to FIG. 3C, to cut the flat round glass disk 2 out of a flat glass 23 by means of a suitable cutting tool 25.

FIG. 3A illustrates a direct semifinished product production, whereas FIGS. 3B–C show an indirect semifinished product production.

The advantages of both direct and indirect semifinished product production are discussed above.

FIG. 4 shows another possibility for semifinished product production. According to FIG. 4, the semifinished product is formed of a profiled tablet 2 whose shape is optimized with respect to the molded hollow glass body to be produced and which is produced by casting analogous to the flat disk 2 according to the alternative shown in FIG. 4A. For this purpose, a correspondingly shaped mold 22 is filled from a glass melt 18 by gob-feeding a gob 19, wherein the glass gob 19 is given the shape-optimized configuration by a press plunger 20 in the mold 22.

It is possible to carry out the semifinished product production by sintering granular powder (quartz sand, other components) as a substitute for the technologically elaborate, cost-intensive tank operation required in the variant according to FIG. 4A.

The advantages of the aforementioned production are:
- economizing on the melting process
- reduction in costs
- simpler technology.

The basic procedure for the production of semifinished products 2 by sintering granular powder (quartz sand, other components) is described more fully with reference to FIG. 4B in process steps 1–6. The embodiment example shows a shape-optimized tablet according to FIG. 4 as a semifinished product 2. It will be appreciated that the semifinished product can also have a different shape, e.g., a disk according to FIG. 3. It is also possible to sinter a glass body in a semifinished product carrier which simultaneously forms the mold corresponding to FIG. 2.

According to FIG. 4, the process is characterized by the following method steps:
1. mixing of raw materials (dry or wet)
2. shaping
3. drying, if required
4. cleaning
5. sintering
6. monitoring.

Step 1: Mixing of Raw Materials

The recipe for the hollow glass includes different raw materials; three materials 39 which are combined to form the batch are indicated in FIG. 4B. The essential components are glass melt sand, low-iron lime, potassium carbonate, sodium nitrate, heavy-soda barium carbonate. The bulk density of the principal components is between 1 and 1.4 g/ml, the density is up to 2.7 g/l, and the grain sizes are between 0.01 and 1.6 mm.

The following two main methods can be applied for mixing the batch:

Dry mixing: Mixing of raw materials (quartz sand, other components) in powder form in the dry state;

Dispersion of powder particles in a liquid: When raw materials in powder form are stored, agglomerates are formed which must be extensively dissolved during dispersion in order to obtain a homogenous green body. The achievable homogeneity is accordingly higher that is the case in dry mixing. Pure water is very suitable as dispersion liquid.

Step 2: Shaping

Mixing is followed by a method step in which the mixture is compressed and brought to the desired configuration of the semifinished product 2, namely, the green body.

Depending on the applied shaping method, the green density of the body after molding is between 10% and 45% of the density of the subsequently sintered body, i.e., the green bodies shrink considerably during sintering.

The shaping must meet the following requirements:
- Good homogeneity of the molded body Otherwise, there is a risk of unwanted imperfections in the sintered glass.
- Uniform, tightest possible pore structure Therefore, uniform shrinkage during sintering, conformable formation of the desired geometry, reduced sintering temperatures with tighter pores.
- Geometry corresponding to requirements In order to avoid uneconomical post-machining.
- Low contamination through extraneous materials Unwanted impurities, e.g., alkaline and alkaline earth impurities, form imperfections in the product and can only be eliminated at high temperatures.

The following methods are suitable for shaping:

A. Uniaxial Pressing of Powders

By this is meant the compaction of the powder by means of a press plunger 40 proceeding from one side.

B. Isostatic Pressing of Powders

By this is meant the compaction of pourable powders with sufficiently high bulk density from several sides, possibly with additional thermal treatment. The necessary bulk density is achieved with determined powders (e.g., silicic acids) through pre-agglomeration.

C. Extrusion

This process provides a continuous extrusion of a smooth, plastic mass, usually dispersion.

D. Centrifuging

This process involves removal of particles from a thinly-viscous suspension by centrifuging.

E. Colloidal Filtering (Slip Casting)

By this is meant the phase separation of the dispersed particles from the dispersion liquid (slip) by pressing the liquid out of a mold through a filter which retains the particles.

F. Shaping by Crosslinking

This method involves flocculation (coagulation) of colloidal particles of a suspension suited to this purpose. Suitability is often achieved only by certain additions, usually fluorides. The suspension is only thinly-viscous in a highly sheared state, whereas it solidifies in the state of rest (thixotropy).

G. Electrophoretic Precipitation

This process is mentioned herein for the sake of completeness as there is currently no known industrial application. When an electric field is applied, the particles in a homogenous suspension move uniformly to a filter and form the green body therein.

H. Sol-gel Method

With the sol-gel method, glasses can be produced without a melting or fining process. The formation of the glass network is carried out by precipitating dissolved $SiO_2$ in a gel. After removing the water, the gel can be sintered to form a compact glass far below the melt temperature.

Step 3: Drying

The shaping of determined starting materials in the second step, e.g., colloidal dispersion or sol-gels, requires subsequent drying before the actual sintering is carried out.

As in ceramics, the drying of moist green bodies is one of the critical process steps due to the risk of cracking. Therefore, many attempts have been made in the past to form the glass particles by pre-pressing directly without dispersion liquids. However, since the uniform dispersion of the particles (homogenous structure) is very difficult to accomplish without liquid, liquid-formed green bodies are produced in most known applications of shaping. For this reason, different drying methods have been developed which are adapted to the particle size, the green density and the resulting pore diameter.

In conventional drying, this is carried out in a temperature-regulated air flow. In order to minimize the risk of cracking during the drying process, a variant is drying in elastic molds, e.g., in an elastic, steam-permeable mold (foil) which shrinks along with the molded article during drying and is not removed until after drying.

Drying by solvent exchange is also known. After shaping in the second step, the dispersion liquid, namely, water, is exchanged through diffusion with a liquid having a lower surface tension which then escapes from the pore spaces as the drying proceeds.

Finally, supercritical drying, as it is called, which is a costly process for drying without cracks and without shrinkage of the green body, can be applied. In this way, the disruptive influences of surface tension during drying can be completely eliminated by exceeding the supercritical point of the dispersion liquid in an autoclave.

Step 4: Cleaning

In the production of highly pure silica glasses, a cleaning process takes place after drying and before sintering, wherein contaminants can be removed almost completely via the pore spaces. This is the essential advantage in the sintering process for these glasses.

The cleaning which is usually carried out in a chlorine-containing atmosphere extends not only to impurities at the surfaces of the grain, but also to impurities in the grain which can be diffused at the surface quickly because of the small diffusion paths. At the surface, they react with the chlorine-containing atmosphere and reach the surface of the molded body via the open pore system.

Step 5: Sintering

During sintering, the green body which still has open pores is compacted to form a transparent glass which, ideally, no longer has any pores. In so doing, the temperature is increased to the extent that the pores are closed via a viscous flow.

Sintering is normally carried out in a conventional furnace in which a plurality of heating elements (e.g., graphite, $MoSi_2$, $ZrO_2$) which are heated by electrical current generate heat which is transferred to the molded article via a work pipe by heat conduction, convection and radiation. The molded article is located in the work pipe. Most furnaces are operated with air as furnace atmosphere, many furnaces (graphite) are also operated with a $N_2/H_2$ inert atmospheres.

In addition, radiation sintering is also known. This is a method which works with a cold work pipe in which the molded article is heated with a thermal radiator or a laser.

Finally, HF sintering and plasma sintering are also known. This inductive heating by means of high-frequency electromagnetic fields is common in the heating of workpieces having sufficient electrical conductivity.

Further possibilities are heating by means of microwave plasma or by means of plasma burners.

Step 6: Monitoring

In this step, a comprehensive monitoring of the sintered semifinished product 2 is carried out with respect to weight, volume, composition and state.

The advantages of a semifinished product 2 according to FIG. 4 are:

simple manufacturing process of the shape-optimized, profiled tablet possibility of optimizing the process for blowing.

However, the risk of destruction of or damage to the semifinished product during transport and its difficult handling and storage due to the profiling of the semifinished product must be taken into account.

Figure 5A:
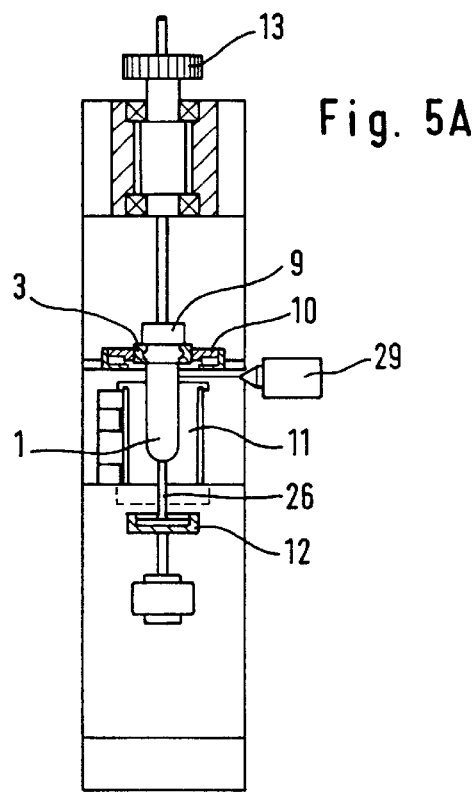
FIG. 5A is an enlarged section of the blowing station from FIG. 5 showing the severing of the top glass by a laser.
Figure 5B:
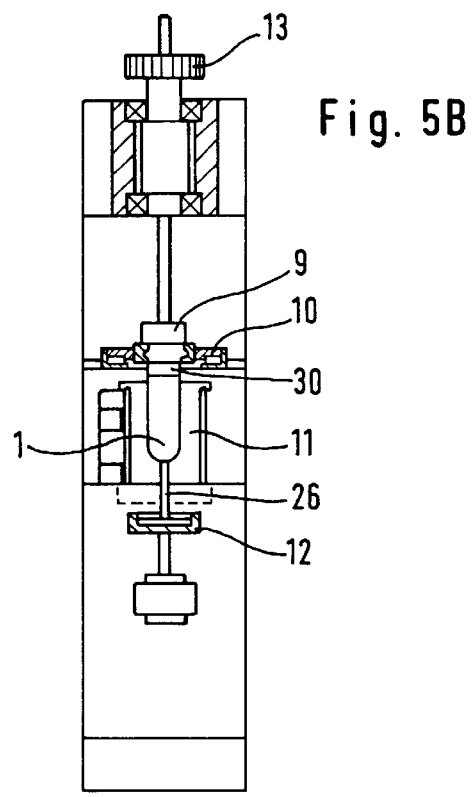
FIG. 5B is another enlarged section relating to the blowing station from FIG. 5 showing the connection of the stem with the goblet.
Figure 5C:
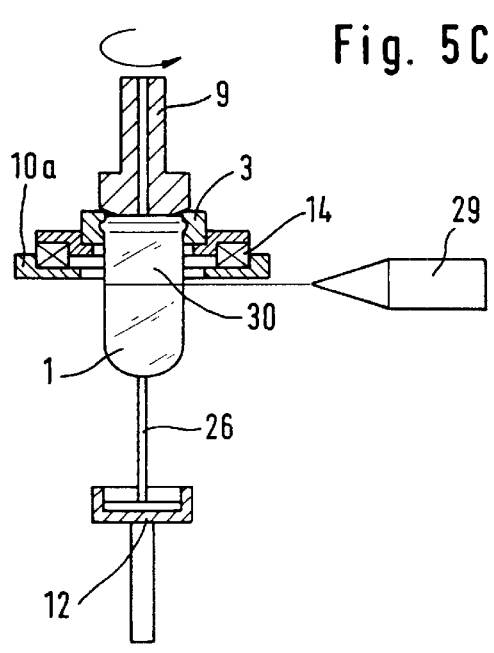
FIG. 5C is a schematic view showing the severing of the top glass by means of a laser.
Figure 5D:
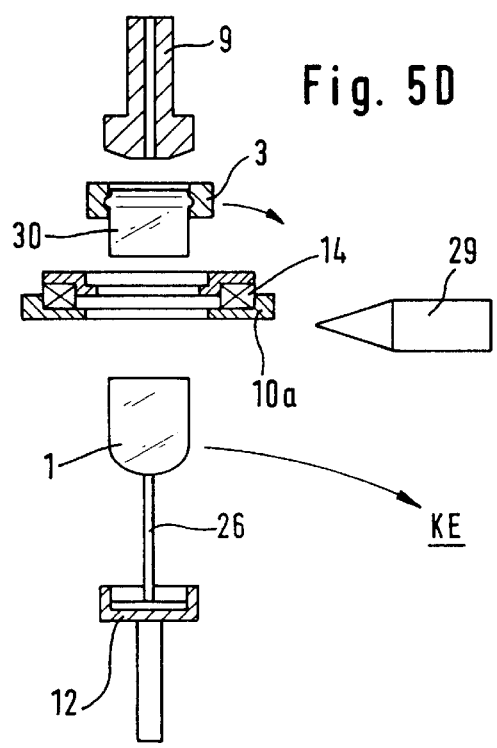
FIG. 5D is a schematic view showing the states in the blow mold after severing the top glass.

FIG. 5 with the enlarged sections according to FIGS. 5A and 5B and the additional views according to FIGS. 5C to 5D show another advantageous embodiment form of the device according to the invention which works according to the method, according to the invention, for producing molded hollow glass bodies 1. The device according to FIG. 5 corresponds in principle to that shown in FIG. 1, but is geared to the manufacture of molded hollow glass bodies 1 in the form of goblets. All of the device parts corresponding to those in FIG. 1 are identified by the same reference numbers and therefore do not require further explanation in this place. The central differences consist substantially in the mold 11 of the blow mold unit for the goblet which is designated in FIG. 5 as KF (goblet shaping unit) and in the bottom lifter 12 adapted to the goblet, the gripper 17, which is likewise adapted to the goblet, and a new function module, the stem feed SZ, from which the stems 26 to be attached to the goblets are transferred to the bottom lifter 12. The stems 26 with their bottom plates can be supplied optionally as semifinished products or can be produced immediately before the goblet shaping in a further function unit, the stem press SP. Stems with bottom plates are pressed from corresponding semifinished products on this stem press. Before this, as in the shaping of the goblet, the respective semifinished products run through the following stations:

supply and isolation of semifinished product, monitoring of semifinished product preheating of semifinished product plasticizing of semifinished product stem pressing.

The fully-automated press cycle of the stem press SP is adapted to the molding cycle. The semifinished products are removed from a storage and fed to the semifinished product supply. After individual monitoring, they are preheated in a continuous furnace and then plasticized on a further station immediately before pressing. In a two-part stem pressing mold, they are pressed from above by a press plunger to form stems before the press mold opens and the stem, including the bottom plate, is transferred by a suitable transfer mechanism to function unit SZ. Function module SZ contains a continuous preheating furnace 28 to which the stems 26 are fed, either as semifinished product from a supply, not shown, or from the stem press SP, by means of a feed system, e.g., a gripper. They are then guided through the furnace by their bottom plate, for example, standing upright on a belt shown in the Figure, and are purposely heated. Shortly before being transferred to the bottom lifter 12 by a suitable transfer device, not shown, with grippers, the stem tip is purposely heated once more, preferably by a radiator 27. The stems are then transferred to the bottom lifter 12 standing on their bottom plate. On the bottom lifter 12, the stem 26 is centered and tensioned. The bottom lifter guides the hot stem from below to the goblet 1. The pressure needed for connecting the stem is applied via the bottom lifter 12. If needed, the connection point can be further heated by a radiator, not shown, during the connection, while the goblet 1 and stem 26 rotate jointly.

After the connection has been carried out, the stem glass 1 is lowered by the bottom lifter and taken over by the removal gripper 17 in function module KE which comprises the goblet removal.

FIG. 5B is an enlarged view in section showing function module KF: the goblet shaping with the attachment of the stem to the goblet 1. In the position shown in the Figure:

the mold 11 is open, the bottom lifter 12 moves with the stem 26 into the upper position, the stem 26 is centered, wherein the goblet and stem rotate.

It is not compulsory to incorporate the connection of stem to goblet in the manufacturing process as shown in FIG. 5. The manufacturing depth can also be configured in such a way that a goblet without stem is produced in the manufacturing unit as a kind of semifinished product which is not provided with a stem until later in the production process. The advantage in producing the connection between the stem 26 and the goblet 1 immediately prior to the shaping of the goblet in function unit KF consists in that the manufacturing process is streamlined and in that the goblet heat present after blowing—heat which is needed for the connection in any case—can be utilized.

Depending on the provided manufacturing depth, the goblet 1 with the stem 26 can be transferred to the goblet removal unit KE with or without the top glass, as it is called. In this connection, FIG. 5A shows the severing of the top glass 30 from the rest of the goblet 1 by the beam of the laser 29, wherein the processes taking place for this purpose are illustrated once again in the schematic views according to FIGS. 5C and D. The beam of the laser 29 is guided to the goblet 1 by optics (not shown) when the glass mold 11 is opened after the shaping process and the bottom lifter 12 is located in the upper position and the glass 1, including the stem 26, is secured from below. The blow head 9, the goblet 1 and the bottom lifter 12 rotate, wherein the blow head 9 is in the lower position corresponding to the view in FIG. 1K. Further machining of the rim can be dispensed with by severing with the laser beam in connection with the rim melting at this point. No additional tension need be introduced into the goblet, so that the remaining low tension can be almost entirely dissipated in a subsequent cooling belt with a low risk of breakage. After severing—this state is shown in FIG. 5D—the severing laser 29 is switched off, the blow head 9 is moved upward and the bottom lifter 12 is lowered. The goblet 1 can then be taken over by the gripper 17 in function module KE for removal. The top glass 30 which is located in the annular semifinished product carrier 3 can then be removed from the semifinished product feed system before the latter feeds the next semifinished product.

This laser severing can also be carried out optionally before the joining of the goblet and stem. In this case, a goblet without top glass and stem is removed.

Function module BE takes over the finished hollow glasses 1 and transfers them to the following process. After the molding process in the goblet shaping unit KF, the hollow glasses 1 are deposited by the removal device 17 on the belt 16, i.e., the discharge device, as was already described in connection with FIG. 1. The goblets are stored intermediately in the discharge device 16 and transported further in a defined manner (individually or by determined piece numbers) as will be described hereinafter with reference to FIG. 9.

When the hollow glasses are removed, in this case in the form of goblets, these hollow glasses have reached different manufacturing depths depending on the selected options (with or without stem connection, with or without severing of top glass). Accordingly, there are different variants for removal and discharge of the goblets. For example, the goblet can be received on the transport belt 16 so as to be standing on its base plate after the top glass has been severed. It is also possible for the hollow glass to be transferred to the belt 16 before it has been severed from the annular semifinished product carrier 3 with the semifinished product carrier down, i.e., with the goblet standing on its head. The separation of the semifinished product carrier 3 from the goblet is carried out in the subsequent processes. There are further variants with respect to removal, depending on how the stem and goblet are connected.

Up to this point, the shaping of goblets and tumblers has been described. Of course, other hollow glassware such as beer glasses, bottles or the like can also be shaped in a corresponding manner by the method and associated device according to the invention.

The manufacturing unit shown in FIGS. 1 and 5 is preferably composed in a variable manner of a plurality of function units FE, also referred to as function modules, on which the individual manufacturing steps take place one after the other, i.e., the manufacturing unit is preferably built in a modular manner. Therefore, it is possible to accomplish the following tasks by means of individual function modules:

preparation of semifinished product
heating of semifinished product
molding of hollow glass by blowing
joining and connection of stems provided as semifinished product with a goblet (option) or
integration of a stem manufacturing module (option) and
discharge of finished hollow glass.

Figure 6:
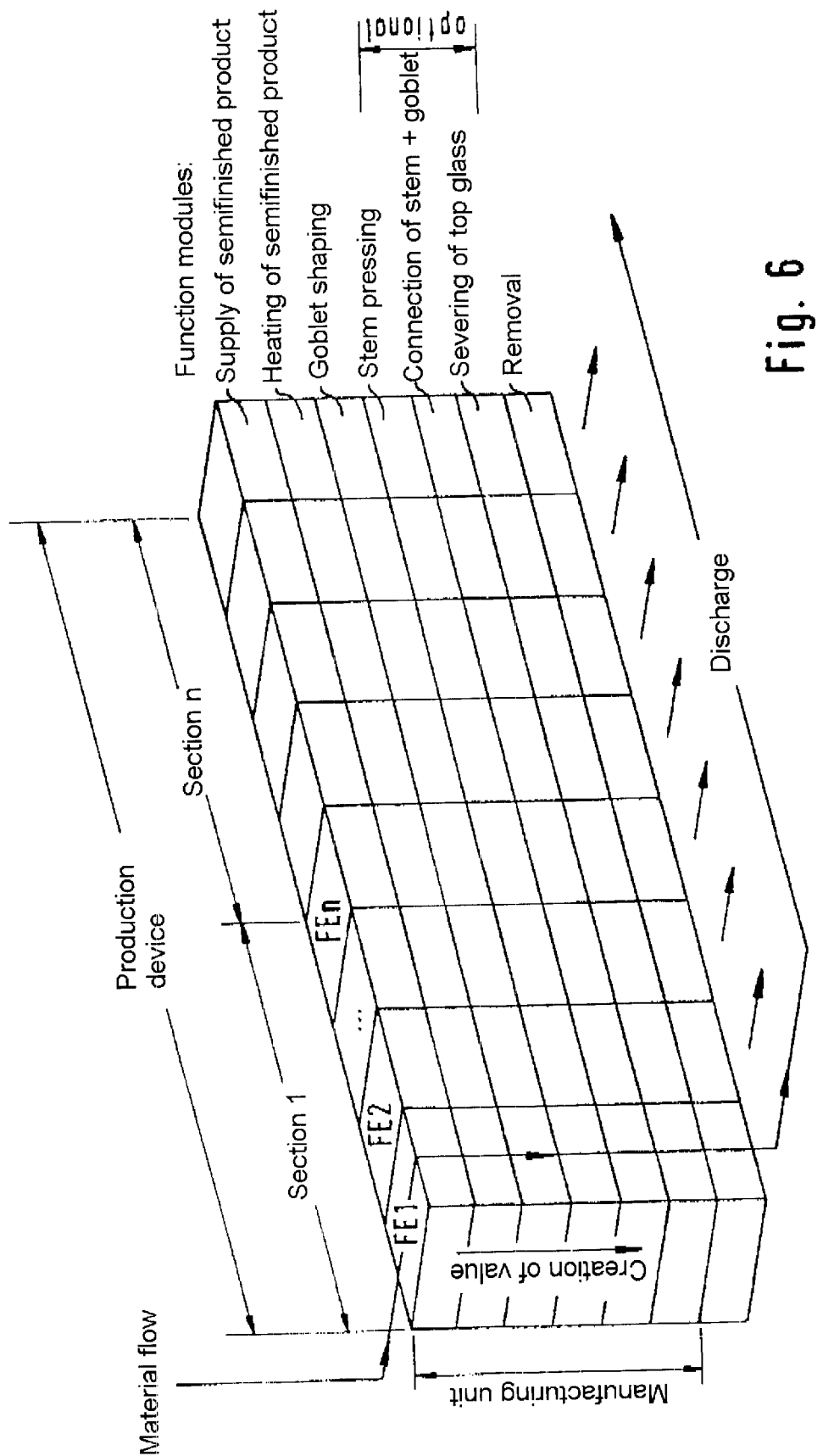
FIG. 6 shows the modular construction of the production device according to the invention in a first alternative.

The entire production device is preferably constructed in such a way that a plurality of manufacturing units (FE1, FE2 ... FEn) which can be combined in a modular manner form one or more sections of a production device. A production device of this kind is shown in FIG. 6, wherein every manufacturing unit is outfitted with individual function modules, optionally as the case may be.

Figure 7:
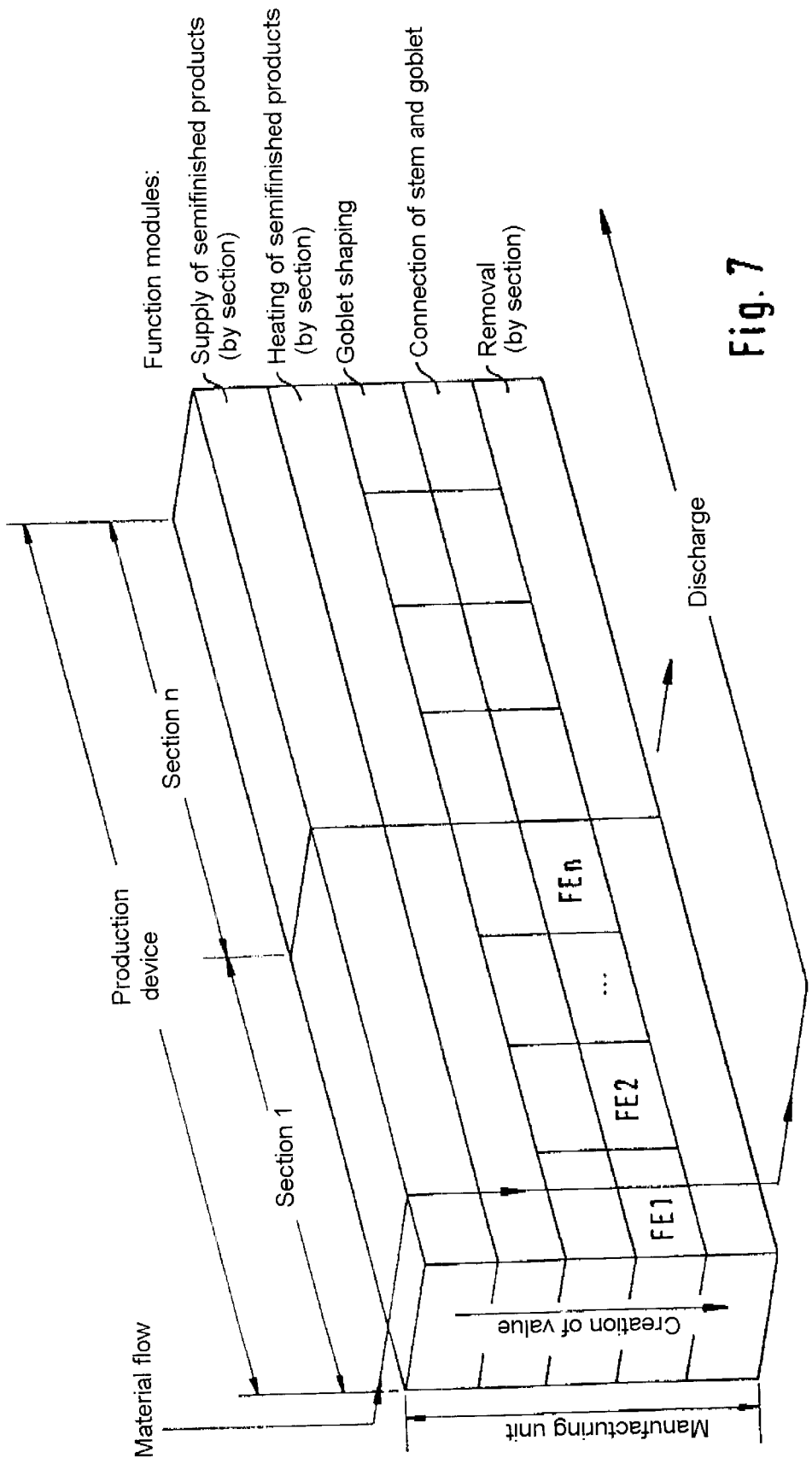
FIG. 7 shows a second alternative modular construction of the production device according to the invention.

FIG. 7 shows a variant in which a plurality of manufacturing units can share function modules as is indicated by the corresponding block diagram.

The following stations are arranged in succession behind the manufacturing devices:

semifinished product supply BV,
semifinished product monitoring K,
semifinished product preheating VW.

The following are situated transversely in front of the manufacturing unit along the production device:

common discharge of hollow glassware, preferably via the conveyor belt 16, and
automatic mold changing device.

It is also possible to assign these stations arranged transversely in front of the manufacturing units to sections.

Figure 8:
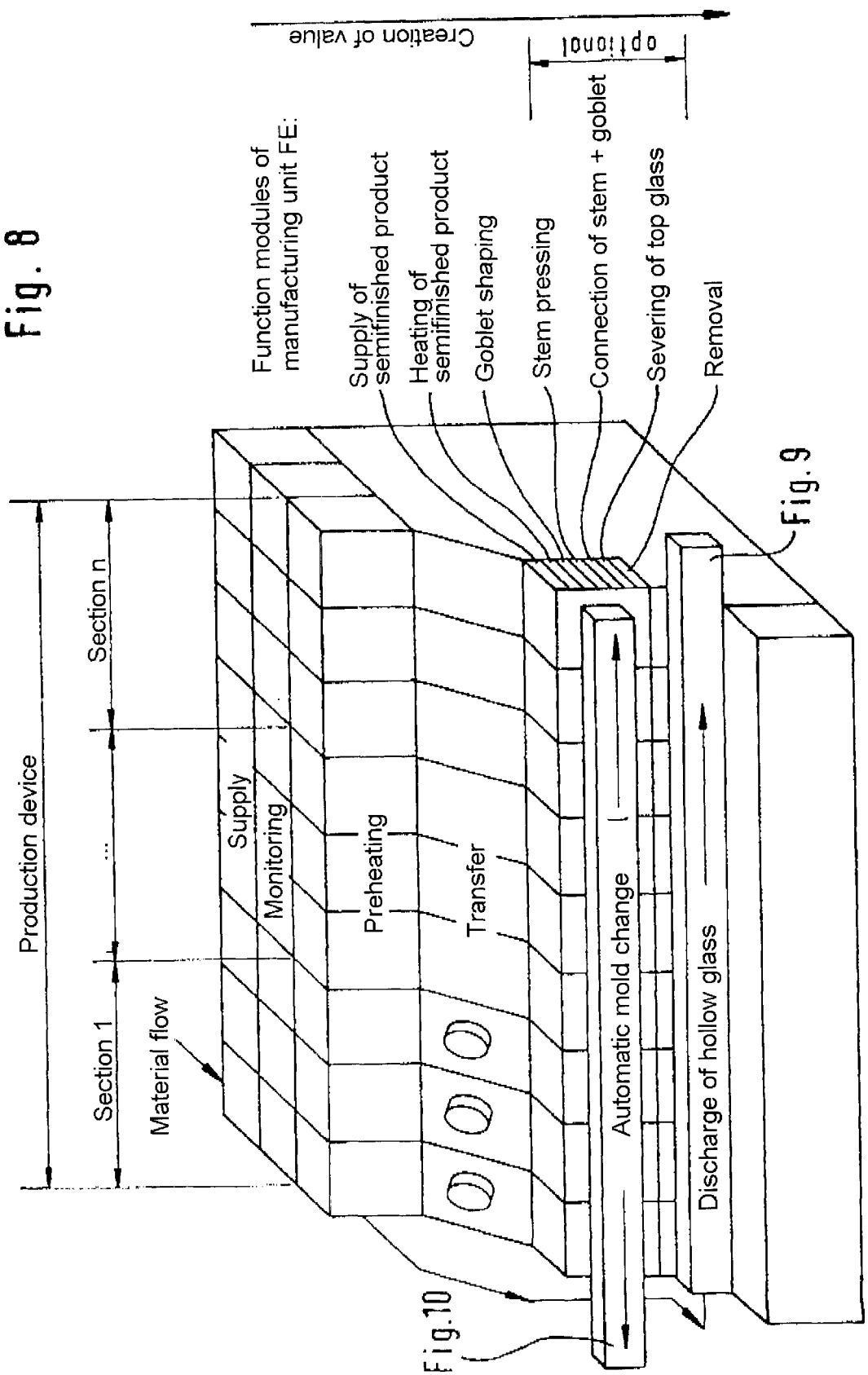
FIG. 8 shows the overall concept of the production device with the peripheral system.

A completed production device of the kind described above is shown in FIG. 8.

Figure 9:
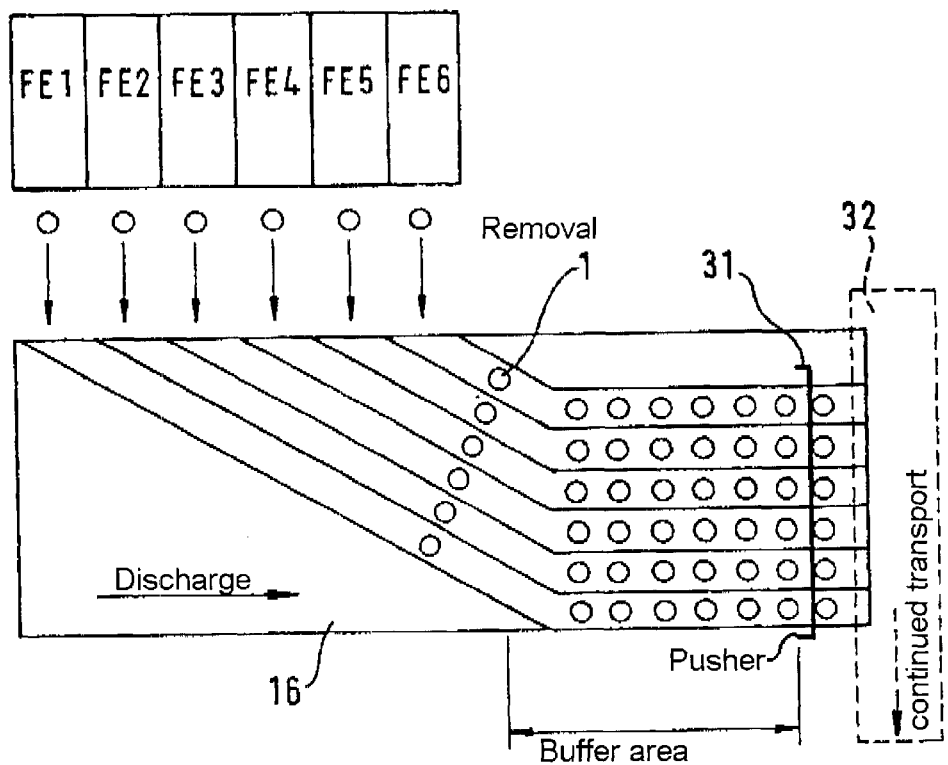
FIG. 9 shows the discharging of molded hollow glass bodies in the modular production devices according to FIGS. 6 and 7.

FIG. 9 shows the discharge of the generated hollow glasses 1 via the transport belt 16 which is located transversely in front of the manufacturing devices FE arranged next to one another. Special deflectors prevent glasses that are already located on the belt from colliding with newly arriving glasses.

The glasses 1 are stored intermediately in the rear area of the belt 16 so that they can be transferred by a pusher 31 which works cyclically, e.g., to an adjoining belt 32.

Figure 10:
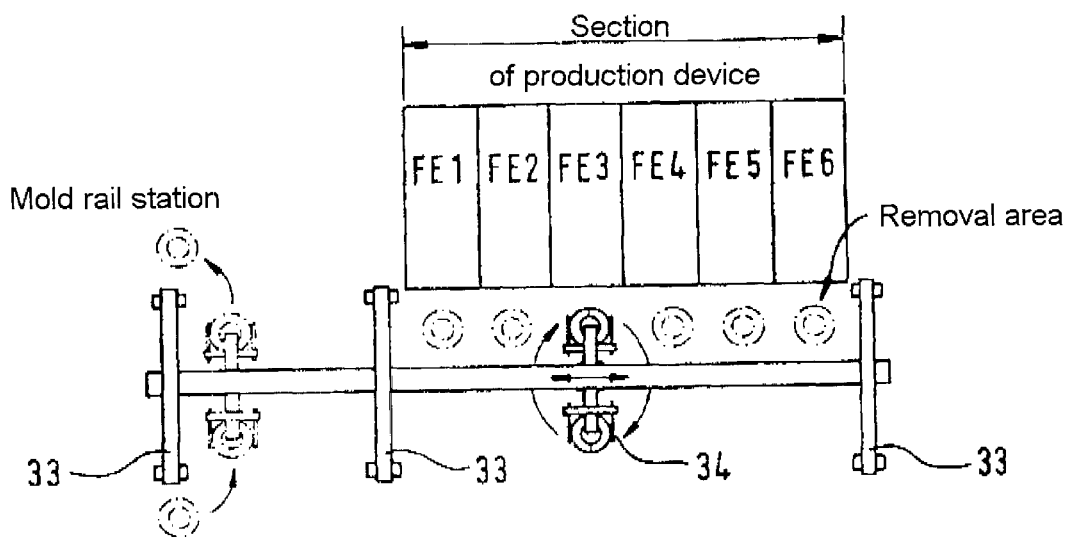
FIG. 10 is a schematic view of the automatic mold changing in the production devices according to FIGS. 6 and 7.

The principle of the automatic mold change for the individual function units is shown in FIG. 10.

The blow molds 11 in the individual function units are pasted before use so that the pasted layer can absorb the water which forms the separating steam cushion during the blowing process. The paste layer is closed through the molding process and the molds must be exchanged occasionally during the course of production.

The unit for automatic mold changing shown in FIG. 10, function unit WE in FIGS. 1 and 5, makes it possible to change molds at a manufacturing unit quickly without additional cost in personnel, while production can continue on the neighboring units. By means of optical monitoring of goblets immediately following molding, the changing of molds can be initiated in case of defective goblets. The automatic changing device is located transversely in front of the manufacturing devices arranged next to one another along the discharge device as can be seen from FIG. 8.

The respective manufacturing unit FE in the area of the blow mold 11 must be accessible from the removal side in order to change molds. The mold casing in which the two inner mold halves are suspended is wide open. A rotatable, longitudinally movable two-sided gripper 34, for example, is located on the portal 33 of the changing unit. The used mold halves are removed proceeding from one side of the arm, the arm is rotated by 180°, and two new mold halves are then inserted from the second side.

The unusable molds are automatically exchanged for new molds at a mold rail station arranged at one side of the portal where they are ready for the next change.

The following advantages are achieved by the modular production device:

clear flow of material within a manufacturing unit from top to bottom
low specific mold costs
possibility of further improvement of determined product characteristics, e.g., reduction of wall thickness, improved geometric design (flatness of top glass and bottom glass, centricity of stem, or the like)
simplification of the subsequent processes through high attainable manufacturing depths (creation of value) on the production device
simpler manufacture of colored glassware and/or stems
simultaneous parallel manufacture of a plurality of small batch sizes and manufacture of a whole series of glasses on one device
experimental operation on one manufacturing unit (null series of new articles, testing of technical improvements, or the like) parallel with production under production conditions
improved utilization of space at the production site and reduced space requirement through variable composition (quantity, construction, etc.) of a plurality of production devices
operation of production device independent of technology-intensive and cost-intensive glass tank operation
manufacture of small batch sizes with reduced use of molds
low losses in refitting of machinery through rapid conversion in parallel with production
reduced downtime (no stoppage of entire plant) in the event of damaged machinery through rapid exchange of the defective module or the complete manufacturing unit with operational component assemblies
reduction of operating costs (personnel, material, energy, molds) through streamlined production process.

In the above-described method and associated arrangement according to the invention, independence from melt tank operation is achieved through the use of semifinished products which are adapted to the product to be manufactured. The modular construction of the production unit meets the demand for high flexibility in manufacturing, so that significant technical, entrepreneurial and economical advantages are achieved in connection with a tank operation through the concept according to the invention.

What is claimed is:

1. A device for producing hollow glassware (1), said hollow glassware (1) including stemware and tumblers, said device comprising a manufacturing line for making semifinished products (2) consisting of solid glass blanks; a manufacturing line for forming the hollow glassware from the semifinished products (2) which is separate from the manufacturing line for making the semifinished products (2) and a storage and supply stage (BV) with storage devices for storing the semifinished products produced in the manufacturing line for making the semifinished products and with transport devices for automatically supplying said semifinished products (2) from the storage devices to the manufacturing line for forming the hollow glassware;

wherein said manufacturing line for forming the hollow glassware from the semifinished products comprises a blow molding stage (BF, KE), said blow molding stage comprising a blow head (9) with a blow work ring, a blowing unit (10), a blow mold (11) and a bottom lifter (12) and in which plastically deformable glass gobs are shaped to form the desired hollow glassware; a removal stage (BE, KE) for removal of the hollow glassware (1) from the blow molding stage and for delivery to subsequent processes, said removal stage (BE,KE) comprising removal devices (15,17); a preheating stage (VW) with heating devices (4, 4a) for preheating the semifinished products (2) supplied thereto from the storage and supply stage (BV); a semifinished product heating stage (HE) with heating devices (8) for further heating of the semifinished products (2) at least to a temperature close to a blowing temperature; a transport stage (HB) with transport devices (5, 5a, 6, 7) for transporting the semifinished products (2) from the preheating stage (VW) to the semifinished product heating stage (HE); and a transfer stage (ÜE) with devices for transferring the semifinished products (2) after the further heating in the semifinished product heating stage (HE) into the blow molding stage (BF, KF), where the semifinished products (2) are available as said plastically deformable glass gobs for blow molding to form the hollow glassware.

2. The device according to claim 1, wherein each of the semifinished products (2) is a flat tablet.

3. The device according to claim 1, wherein each of the semifinished products (2) is a shape-optimized tablet.

4. The device according to claim 1, wherein each of the semifinished products (2) is received, as a shape-optimized glass body, in a semifinished product carrier (3) in the semifinished product heating stage (HE), so as to form a processing unit together with this semifinished product carrier (3).

5. The device according to claim 4, wherein the semifinished product carrier is annular, and a receptacle for the semifinished product carrier is provided in the blow molding stage (BE, KE) as said blow work ring during the blow molding.

6. The device according to claim 4, wherein the semifinished product carrier (3) has an outer contour that is standardized with respect to form, thickness and diameter and a profile that is adapted to the hollow glassware (1) to be molded.

7. The device according to one of claims 4 to 6, further comprising a severing device (29) for severing the molded hollow glassware (1) from the semifinished product carrier (3).

8. The device according to claim 1, further comprising a semifinished product monitoring stage (K) with means for automatically monitoring a state of the semifinished products (2) and for sorting said semifinished products (2) according to weight and size as well as said state and wherein said semifinished product monitoring stage (K) is arranged between the storage and supply stage (BV) and the preheating stage (VW); whereby only said semifinished products (2) of a predetermined weight, size and state are supplied to said preheating stage (VW).

9. The device according to claim 1, wherein the heating devices (4, 4a) in the preheating stage (VW) include a continuous heating furnace (4) with radiation burners (4a).

10. The device according to claim 1, wherein the transport devices in the transport stage (HB) are formed by pushers (5, 5a) and a chute (6) or by a gripper arm (7).

11. The device according to claim 1, wherein the heating devices in the semifinished product heating stage (HE) are formed by a heat radiator (8), a gas radiator or gas-oxygen radiator or by microwave radiators (35–38), which are arranged in a substantially closed chamber.

12. The device according to claim 11, wherein the blow head (9) is provided with a bore hole for feeding in compressed air and the heating devices are arranged so that the semifinished products (2) are heated to a temperature in the vicinity of the blowing temperature and further comprising a laser for heating in the blow head (9), said laser being arranged so that a laser beam is fed through the bore hole in the blow head (9).

13. The device according to claim 11, wherein the heating devices are arranged in such a way that further heating to the blowing temperature is carried out in an individual step in a separate device in parallel with the blowing process.

14. The device according to claim 1, wherein the devices for transferring in the transfer stage (ÜE) are formed by a swivel arm with grippers.

15. The device according to claim 1, wherein the respective stages of preheating (VW), transport (HB), semifinished product heating (HE), blow molding (BE, KF) and removal (BE; KE) are independent function modules and are combined in a basic framework of a modular manufacturing unit (FE) to which further modules including modules for stem feed, stem pressing and severing of top glass may be added optionally.

16. The device according to claim 15, wherein a plurality of said modular manufacturing units (FE) are combined in a modular manner to form respective sections and said respective sections are connected together to form a production plant.

17. The device according to claim 16, wherein each of said manufacturing units (FE) is outfitted with individual ones of said function modules.

18. The device according to claim 16, wherein a group of said manufacturing units (FE) share function modules.

19. The device according to claim 16, further comprising additional stages for semifinished product supply (By), semifinished product monitoring (K) and semifinished product preheating (VH) arranged behind the manufacturing units (FE).

20. The device according to claim 16, wherein a discharge device (16) for joint discharge of produced molded hollow glass bodies and an automatic mold changing device (33, 34) are provided transversely in front of the manufacturing units (FE) and longitudinal to the production plant.

21. A method for producing hollow glassware (1), said hollow glassware (1) comprising stemware and tumblers, by blow molding plastically deformable solid glass gobs, said method comprising the steps of:
 a) making a plurality of solid glass blanks in the form of fabricated semifinished products (2) in a manufacturing line for making the semifinished products (2);
 b) storing said semifinished products produced in step a) in a storage and supply stage (BV), said storage and supply stage (BV) including storage devices for storing and transport devices for supplying the semifinished products;
 c) automatically feeding the semifinished products (2) from the storage and supply stage (BV) to a manufacturing line for forming the hollow glassware from the semifinished products by means of the transport devices provided in the storage and supply stage (BV), said manufacturing line for forming the hollow glassware from the semifinished products being separate from said manufacturing line for making the semifinished products;
 d) preheating the semifinished products (2) supplied during the feeding of step c) with heating devices (4,4a) in a preheating stage (VW) of the manufacturing line for forming the hollow glassware from the semifinished products;
 e) supplying preheated semifinished products (2) from the preheating stage (VW) to a semifinished product heating stage (HE) for further heating by means of transport devices (5, 5a, 6, 7) of a transport stage (HB);
 f) heating the semifinished products (2) to blowing temperature to form the plastically deformable solid glass gobs in further heating devices (8) in the semifinished product heating stage (HE) of the manufacturing line for forming the hollow glassware from the semifinished products;
 g) transferring the glass gobs from the semifinished product heating stage (HE) to a blow molding stage (BF,KF) for shaping to form the hollow glassware (1) by means of transfer devices (E), said blow molding stage (BF,KF) comprising a blow head (9), a blowing unit (10), a blow mold (11) and a bottom lifter (12);
 h) blow molding of said glass gobs supported by the bottom lifter (12) in the blow mold (11) to form the hollow glassware (1); and
 i) removing the hollow glassware (1) from the blowing unit (10) and the blow mold (11) and delivering the hollow glassware to subsequent processes by means of removal devices (15,17) of a removal stage (BE,KE).

22. The method according to claim 21, wherein said solid glass blanks are produced by punching or cutting round flat glass disks (2) from flat glass (24).

23. The method according to claim 21, wherein said solid glass blanks are each produced by casting a glass tablet (2) in a mold (22).

24. The method according to claim 23, wherein the glass tablet (2) is flat.

25. The method according to claim 23, wherein the glass tablet (2) is profiled and has a shape that is optimized with respect to the hollow glassware to be produced.

26. The method according to claim 21, further comprising direct production of each of the semifinished products (2), with a given shape that is optimized with respect to the hollow glassware (1) to be produced, by filling a semifinished product carrier (3) having an optimized internal shape with glass raw material from a melt; and wherein one of the semifinished products (2) remains in the semifinished product carrier (3) in subsequent processing steps until the hollow glassware is severed.

27. The method according to claim 21, further comprising production of the semifinished products (2) with a predetermined configuration in the manufacturing line for making the semifinished products by a sintering process.

28. The method according to claim 27, wherein the sintering process comprises sintering in semifinished product carriers (3) with an internal shape determining configuration and the semifinished products remain in the semifinished product carriers in subsequent processing steps until the hollow glassware is removed.

29. The method according to claim 27, wherein said sintering process comprises the following steps:
 mixing of raw materials (39);
 shaping or molding a plurality of green bodies from the raw materials;
 drying the green bodies, optionally depending on the shaping process;
 cleaning the green bodies;
 sintering the green bodies to form the semifinished products (2) for the production of the hollow glassware; and
 monitoring the semifinished products (2).

30. The method according to claim 21, wherein said hollow glassware (1) are goblets (1) with stems (26), said stems (26) are connected with the goblets in the blow mold and said stems (26) are manufactured separately as an intermediate product.

31. The method according to claim 21, wherein said hollow glassware (1) are goblets (1) with stems (26), said stems (26) are connected and joined with the goblets (1) in the blow molding stage, wherein said stems (26) are manufactured within said manufacturing line for forming the hollow glassware from the semifinished products.

32. The method according to claim 21, wherein said semifinished products (2) are preheated to approximately 500° C. and then heated to a blowing temperature of 1050° C. in two steps by means of a first heating process to approximately 900° C. shortly before the blow molding stage (BF, KF), followed by a second heating process to said blowing temperature of approximately 1050° C. in the blow molding stage (BF, KF).

33. The method according to claim 21, wherein said semifinished products (2) are preheated to approximately 500° C. and then heated to a blowing temperature of about 1050° C. and the heating to the blowing temperature is carried out in an individual step in a separate device (8) with transfer of the plasticized semifinished products (2) to the blow molding stage (BF, KF).

34. The method according to claim 32, wherein the heating of the semifinished products (2) is carried out by means of microwave radiation.

35. The method according to claim 21, further comprising severing of residual top glass (30) from the hollow glassware (1) by laser beam in the blow molding stage (BF, KF) after opening the blow mold.

36. The method as defined in claim 21, further comprising automatically monitoring and sorting said semifinished products according to weight, size and state in a monitoring stage (K) and only automatically feeding said semifinished products having predetermined values of said weight and said size and a predetermined condition to the preheating stage (VW) of the manufacturing line for forming the hollow glassware from the semifinished products (2).

* * * * *